Dec. 8, 1931. A. R. BOND 1,835,589
MEANS FOR FORMING COIL SPRINGS
Filed April 9, 1929
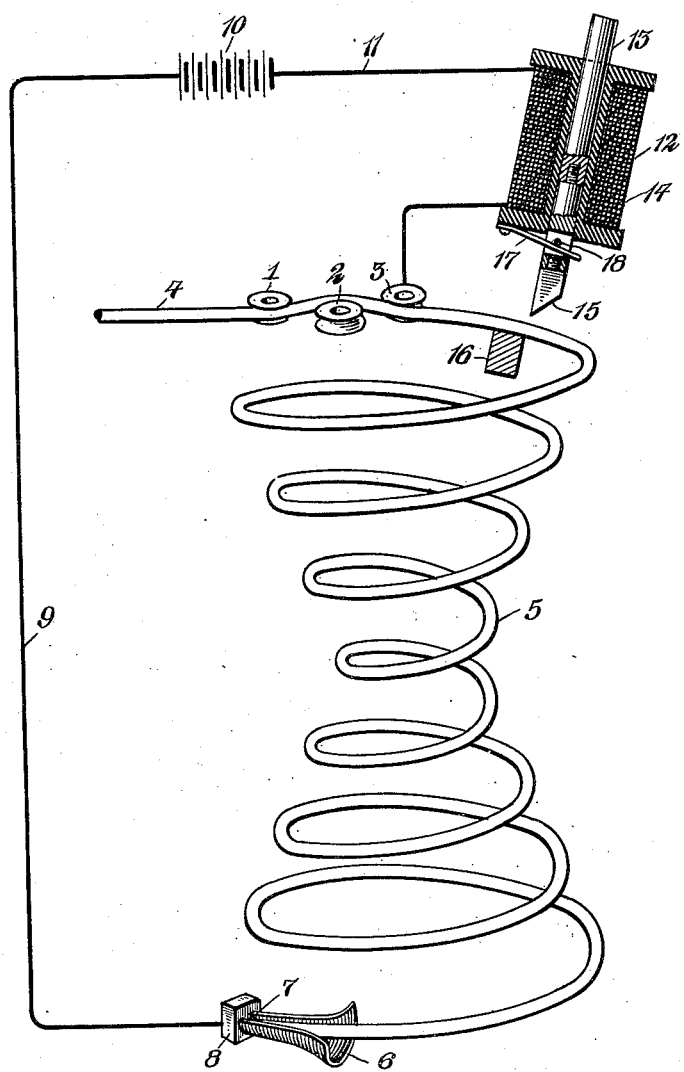
INVENTOR
A. Russell Bond
BY
ATTORNEY Patented Dec. 8, 1931

1,835,589

UNITED STATES PATENT OFFICE

ALEXANDER RUSSELL BOND, OF PLAINFIELD, NEW JERSEY, ASSIGNOR TO THE OWEN AUTOMATIC SPRING MACHINERY COMPANY, A CORPORATION OF OHIO

MEANS FOR FORMING COIL SPRINGS

Application filed April 9, 1929. Serial No. 353,849.

My invention relates to improvements in means for forming coil springs.

The invention relates more specifically to the forming of coil springs of uniform angular length, i. e. springs whose opposite ends, regardless of variations in diameter of the spring coils, will always bear a uniform angular relation to each other.

The invention is particularly adapted for the forming of coil springs to be used in spring structures for cushions, seats, mattresses and the like.

Formerly, it was the practise to knot the ends of such springs; in other words, each spring end was wrapped around an adjacent part of the spring so that the spring was formed with a closed coil at each end. Recently, it has been found desirable to form spring structures in which the springs were provided with open end coils, each free spring end being connected by a metal clip to an adjacent spring. An advantage of this arrangement is that it gives greater flexibility to the spring structure, particularly where a hinged joint is provided between the clip and one of the coils. The clips may be applied by hand or by machine, as special machines have been provided to perform the clipping operation.

One of the difficulties encountered in making such spring structures is that springs, as heretofore made, vary considerably as to the angular relation to each other of the opposite ends of each spring. Usually, it is desirable to have a clip at one end of the spring disposed in the same plane as that at the other end, or else at an angle of 180 degrees thereto. If the spring is to be connected to more than two adjacent springs the angular relation between the opposite spring ends may be correspondingly varied, but in any case there must be a fixed predetermined angular relation between the spring ends to which the clips are affixed. If this angular relation exceeds a predetermined amount, one of the spring ends will project from the clip and must be cut off after the clip has been applied to prevent the projecting end from piercing or tearing the padding or covering placed over the springs and also to prevent it from catching in and tangling with other spring structures when a number of the structures are packed together for shipment. On the other hand, if the angular relation is less than the predetermined amount, the spring must be stressed to bring both spring ends into proper alinement with the adjacent spring to which they are to be connected, and this results in warping or twisting of the spring structure. Furthermore, such stressing of the springs can only be done by hand and if the clips are applied by machine, after one spring end has been clipped the opposite spring end will fall short of the clipping mechanism. To overcome the possibility of failure to clip both ends of each spring, it has been the practise to make the springs a little longer than required so that there will always be a spring end in position to be clipped and after the clipping operation the surplus wire projecting from the clip is cut off or bent inward. This procedure entails considerable waste of spring stock, and loss of time in cutting off the spring ends after the clipping has been completed.

I am aware that efforts have been made to produce a spring coiler which would coil springs of uniform dimensions so that the opposite spring ends would always bear a predetermined angular relation. These efforts have been based on the theory that the angular variation of the spring ends is due to slippage of stock in the bending rolls of the coiler, it being thought that if a definite length of wire were fed for each spring, the resulting springs would be uniform. However, the difficulty lies not only in slippage but also in metallurgical variations of the spring stock. Two pieces of wire of exactly the same length and run through the same coiler will not produce springs that are exactly alike if the elasticity of one wire is greater than that of the other. The more elastic wire will not be bent as much as the other wire and the resultant coils will be slightly larger. The variations in diameter of the coils might be inappreciable, but the variation in angular relation of the spring ends would be considerable because it would be affected by the average variation of circumference of the spring coils, multiplied by the number of the coils.

It is an object of my invention to overcome the difficulty not by measuring the length of the wire that is fed through the coiler, but by measuring the spring after it has been coiled and cutting off the spring from the wire stock after the free end of the spring has described a helical orbit of predetermined angular measure.

Another object of my invention is to provide a system whereby the spring itself determines and controls the point at which it is cut off from the spring stock.

The accompanying drawing is a somewhat diagrammatic illustration of an embodiment of my invention showing how the spring controls mechanism for cutting itself off the wire stock. It will be understood, however, that there are other ways in which the same effect may be accomplished, aside from that shown in the particular embodiment illustrated.

In the drawing, the spring coiler is indicated diagrammatically by a set of grooved rollers 1, 2 and 3 which bear on opposite sides of a length of wire 4, producing a bend in the wire. The wire is fed through the bending rollers in any well known manner and the relative position of the rollers may be varied during the feed of the wire therethrough so as to produce a spring of hour glass form, such as illustrated, or they may be held in fixed position so as to produce a cylindrical spring. Other variations may also be provided to produce special forms of springs, all of which are well known in the art and hence need no special description here.

As the spring stock 4 passes through the rollers 1, 2 and 3, it is bent into a coil spring 5. At a suitable point below the bending rollers, I provide a guide 6 having a flaring mouth into which the free end 7 of the spring 5 will enter after a predetermined number of coils have been formed in the spring. The guide 6 is made of hard rubber or other suitable insulating material and terminates in a contact block 8 of conducting material. The block 8 is connected by a wire 9 to one terminal of a battery 10 or other source of electrical energy, while the other terminal of the battery is connected by a line 11 to one of the bending rollers. Inserted in the line 11 is a solenoid 12 provided with a plunger 13. Secured to the plunger and magnetically insulated therefrom by a spacer 14 of bronze or other suitable non-magnetic material, is a cutter 15 which coacts with an anvil 16 adjacent the bending rollers to sever the spring 5 from the spring stock 4. A spring 17 on the solenoid bears against a pin 18 on the spacer 14 and serves to hold the cutter normally clear of the spring.

In operation, as the wire is fed through the bending rollers and over the anvil 16 it will continue to be coiled freely until the free end 7 enters the guide 6 and is guided thereby against the block 8. As soon as the wire end 7 makes contact with the block 8, the circuit of the battery will be completed by way of the coil 5 through the solenoid 12, and the cutter 15 will then be actuated to sever the spring 5 from the wire stock 4. As soon as the spring 5 is cut off it will drop breaking the circuit of the solenoid 12 and the cutter will be retracted by a spring 17. In the meantime, the wire 4 will continue to feed through the bending rollers and another spring will be formed, only to be cut off when the free end thereof engages the block 8. It will be evident that by this means all the coils produced by the coiler will be uniform in respect to the angular relation of their opposite ends, regardless of slippage or of metallurgical variations in the spring stock. As shown in the drawing, the spring ends are disposed at an angle of 180 degrees to each other, plus an overlap equal to the width of the clip that is to be applied. This angular relation may be varied as desired by varying the angular position of the block 8 with respect to the cutter 15. The linear distance between the block and cutter may also be varied for longer or shorter springs and the block 8 will have to be adjusted radially with respect to the axis of the spring for coils that vary considerably in diameter.

It will be understood that the mechanism as here illustrated is largely diagrammatical and that many variations may be made in its form, so as to adapt the process to spring coilers of different types. Other well known forms of wire bending means may be employed. Instead of using electrical energy to operate the cutter 13, it will be evident that the electrical energy may be employed to initiate the operation of a standard cut off mechanism. Thus my invention is not limited to the specific embodiment illustrated, but includes such variations as fall within the spirit and scope of the appended claims.

I claim:

1. In a spring coiler, bending rollers between which spring stock is fed to form a coil spring, a cutter for severing the spring from the stock, an electric circuit having one terminus thereof connected to the spring, a contact block connected to the other terminus of the circuit, said block being fixed in the path of the free end of the spring whereby said spring after being fed through a predetermined orbit will strike the block and close said circuit, and means actuated by closure of said circuit for operating the cutter to sever the spring from said stock.

2. In a spring coiler, bending rollers between which spring stock is fed to form a coil spring, a cutter for severing the spring from the stock, an electric circuit having one terminus thereof connected to the spring, a contact block connected to the other terminus of the circuit, said block being fixed in the path of the free end of the spring whereby the spring end after being fed to a predetermined extent will strike the block and complete said circuit, means for guiding said free end to said block, and means actuated by closure of the circuit for operating the cutter to sever the spring from said stock.

In testimony whereof, I have signed this specification.

ALEXANDER RUSSELL BOND.